Patented Aug. 17, 1943

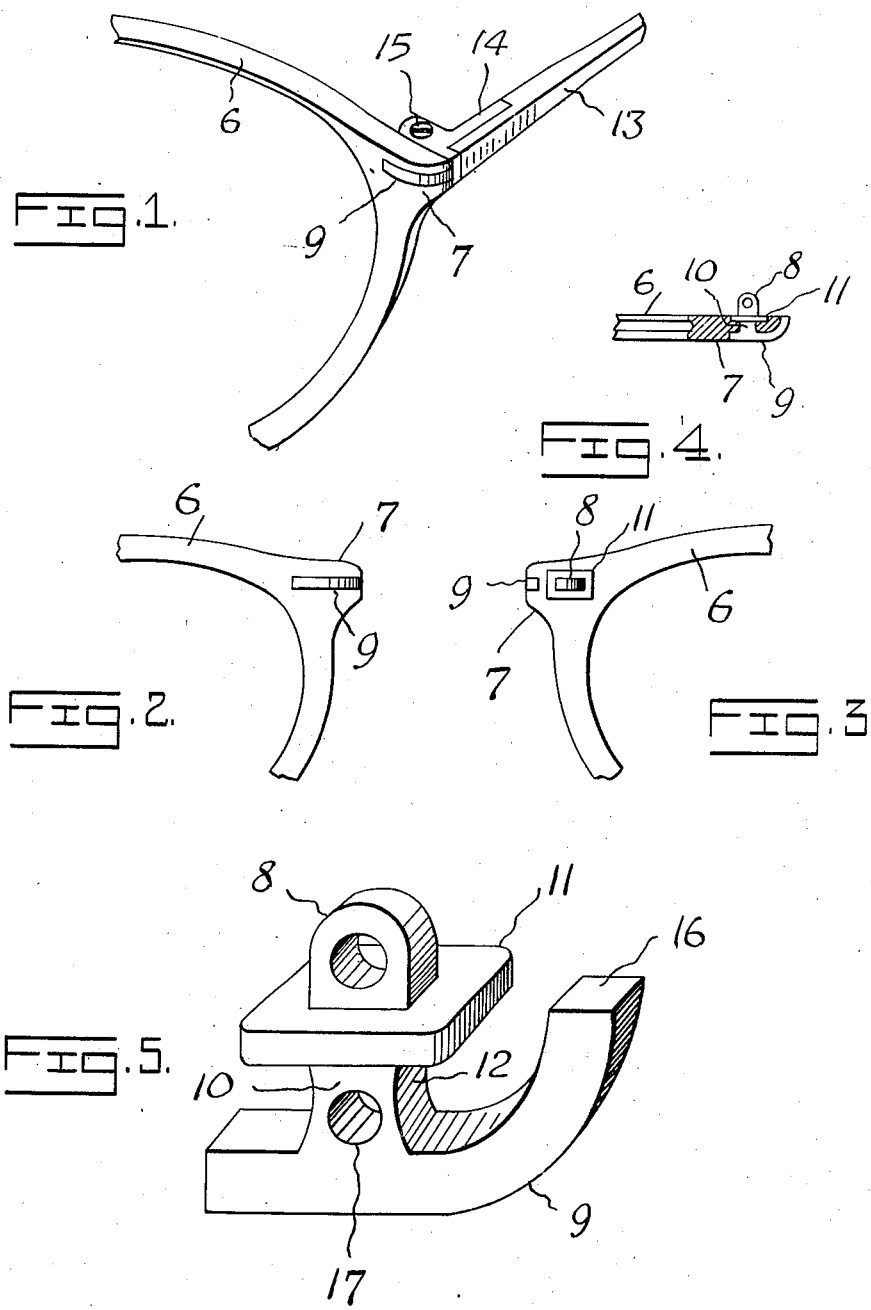

2,326,971

UNITED STATES PATENT OFFICE 2,326,971

SPECTACLE HINGE

Stephen Rey, Long Island City, N. Y., assignor to Zylo Ware Corporation, Long Island City, N. Y.

Application March 27, 1941, Serial No. 385,460

6 Claims. (Cl. 88—53)

This invention relates to spectacle hinges, and more particularly to the hinges of spectacles having frames of plastic or non-metallic material.

One object of the invention is to provide an improved form of hinge giving greater strength and durability. A further object is to provide a hinge piece having novel means for its attachment to the frame of the spectacles and whereby the appearance of the hinge is improved; and a still further object is to so construct the hinge that the dimensions of the hinge-carrying member may be reduced to a minimum.

With these and other objects in view the invention consists in the novel construction of hinge and hinge-carrying member, as hereinafter described, illustrated in the accompanying drawing, and particularly pointed out in the appended claims; it being understood that various changes may be made in the form or construction of the hinge or of the hinge-carrying member without departing from the spirit of the invention or sacrificing any of the advantages thereof.

In the accompanying drawing, Fig. 1 is a perspective view of part of a spectacle frame showing a part of a temple hinged thereto; Fig. 2 is a front view of a frame portion; Fig. 3 is a rear view of the same; Fig. 4 is a horizontal section through the hinge-carrying member, and Fig. 5 is an enlarged perspective view showing the hinge piece.

The spectacle frame or lens rim 6 is formed of plastic or other non-metallic material and is of conventional design except that an integral hinge-carrying extension 7 thereon is of reduced dimensions. The part 7 as clearly shown at Figs. 2 and 3 extends horizontally from the rim to the extent necessary for the attachment of the hinge but this extension is considerably less than the extension necessary for the reception of the usual hinge-securing rivets.

The members 7 may be located at the level of the centers of the lenses or towards the upper part of the lenses and this particular location of the hinge receiving members forms no part of the present invention.

The hinge piece anchored to the member 7 comprises an eye part 8 formed integral with a front part 9 with an intermediate part 10 of reduced width and a separate collar or washer 11 that fits over the eye part 8.

The non-metallic member 7 is formed in the front thereof and around its curved outer front face with a horizontal groove for the reception of the part 9 and with an opening extending from front to back for the passage of the eye part 8 and for the accommodation of the part 10; and this opening is so formed that the plastic material extends into the concave spaces 12 in the sides of the part 10. The hinge piece may be introduced into the member 7 while the plastic material is in a comparatively soft condition after being subjected to heat and as the material cools it engages closely with the concave sides 12 and the part 10 is firmly anchored in place. In the hinge piece shown at Fig. 5 a hole 17 is also provided in the part 10 for the reception of the plastic material for additional anchorage of the hinge as the material cools and hardens. The rear face of the member 7 is recessed for the reception of the collar or washer 11 which thus prevents any tendency of the hinge member to rock in the part 7.

When the hinge piece is in position in the member 7 the eye part 8 projects rearwardly therefrom while the rear face of the collar 11 is flush with the rear surface of the member 7; and the outer face of the part 9 is flush with the front and curved end face of said member 7 while the extreme end face 16 (Fig. 5) of the part 9 is flush with the rear surface of the member 7 and of the collar 11 so that a smooth and attractive appearance is presented.

The temple 13 may be of any usual or conventional form and has a hinge piece 14 with a hinge pin 15 for pivotal connection with the eye 8.

Although the drawing and the above specification disclose the best mode in which I have contemplated embodying my invention, I desire to be in no way limited to the constructional details disclosed, for in the further practical application of my invention many changes may be made in construction, arrangement, and dimensions as circumstances require or experience suggests without departing from the spirit of the invention within the scope of the appended claims.

What I claim is:

1. In a hinge for spectacles, a perforated hinge-carrying member on the spectacle rim and a hinge part comprising a head exposed at the front and end of said member, an integral shank extending through said perforation and protruding from the back of said member, and a hinge-pin-receiving eye formed in the end of said shank.

2. In a hinge for spectacles, a perforated hinge-carrying member formed on the spectacle rim and a hinge part comprising a head exposed at and recessed in the front and end of said member, a shank integral with the head and extending through said perforation, and a hinge-pin-receiving eye formed in the end of said shank.

3. In a hinge for spectacles, a perforated hinge-carrying member formed on the spectacle rim, a groove formed in the front and around the end of said member, and a hinge part comprising a head shaped to fit said groove, a shank extending through said perforation and protruding from the back of said member, a collar mounted on the protruding end of said shank to prevent movement of the hinge part after assembly, and a hinge-pin-receiving eye formed in the end of said shank.

4. In a hinge for spectacles, a perforated hinge-carrying member formed on the spectacle rim, a groove formed in the front and around the end of said member, and a metal hinge part comprising a head shaped to fit said groove, an integral shank extending through said perforation and protruding from the back of said member, a collar mounted on the protruding end of said shank and recessed in the back of said member to prevent movement of the hinge part when assembled, and a hinge-pin-receiving eye formed in the end of said shank.

5. In a hinge for spectacles, a laterally projecting perforated hinge-carrying member on the spectacle frame, a horizontal groove formed in the front and in the projecting end of said member, and a hinge-part comprising a head shaped to fit in said groove flush with the front and end surfaces of said member, an integral shank fitting said perforation and protruding from the back of said member, an eye formed in the end of said shank to receive the hinge pin, and a collar mounted on said shank and adapted to prevent movement of the hinge part after assembly.

6. In a hinge for spectacles, a perforated hinge-carrying member on the spectacle frame, a groove formed in the front and curving around the end of said member, and a hinge part comprising a head accommodated in said groove flush with the front and end surfaces of said member, an integral shank rectangular in cross-section and having concave side faces extending through said perforation and protruding from the rear face of the member, and an eye formed in said protruding end of said shank to receive the hinge pin.

STEPHEN REY.